Aug. 12, 1941.　　　R. S. KERSEY　　　2,252,126
LAWN MOWER HANDLE
Filed Feb. 15, 1940
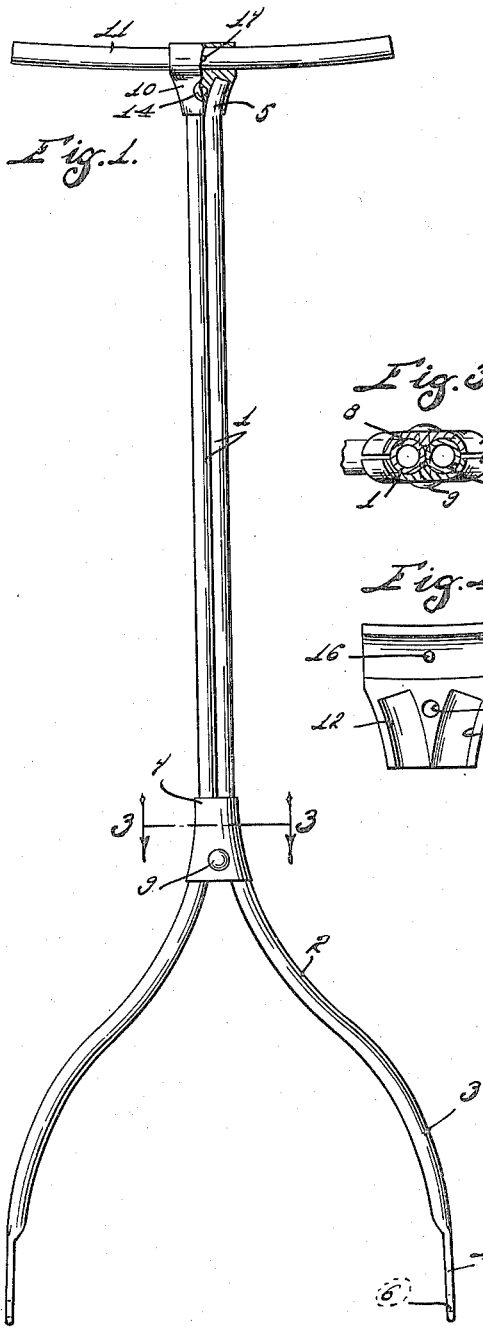
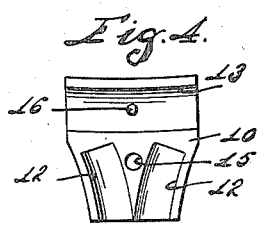
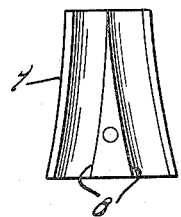
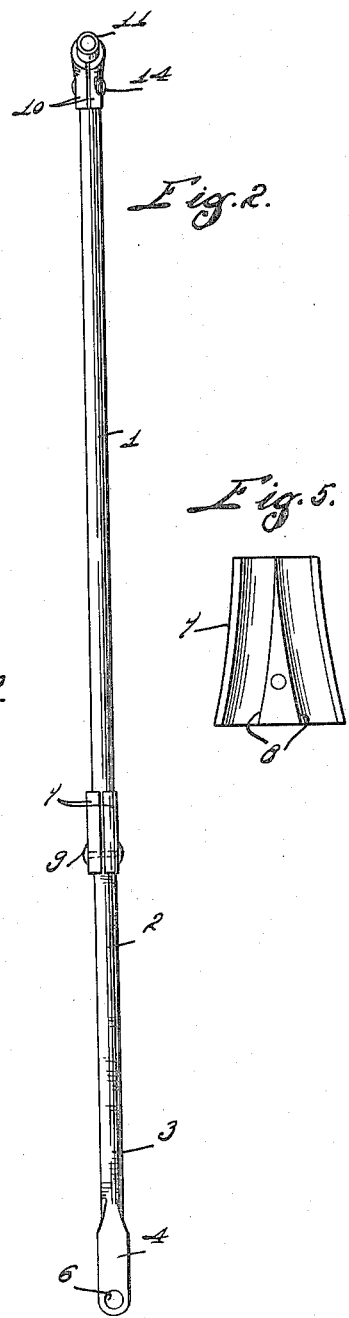
INVENTOR.
Robert S. Kersey,
BY Hood & Hahn.
ATTORNEYS.

Patented Aug. 12, 1941

2,252,126

UNITED STATES PATENT OFFICE 2,252,126

LAWN MOWER HANDLE

Robert S. Kersey, Muncie, Ind., assignor to Great States Corporation, Shelbyville, Ind., a corporation of Indiana Application February 15, 1940, Serial No. 319,023

4 Claims. (Cl. 56—249)

The present invention relates to improvements in handles, primarily of the type adapted for lawn mowers, and like structures.

One of the objects of my invention is to provide an improved type of metal handle which may be formed primarily of tubular bars which, when assembled, provide an attractive rigid handle member for lawn mowers, or similar devices.

Another object of my invention is to provide a tubular bar type of handle which, for shipping and other purposes, may be readily knocked down and which may be quickly and readily assembled.

For the purpose of disclosing the invention, I have illustrated an embodiment thereof in the accompanying drawing, in which:

Fig. 1 is a front elevation of a handle embodying my invention;

Fig. 2 is a side elevation;

Fig. 3 is a sectional view taken on the line 3—3 of Fig. 1;

Fig. 4 is a face view of the top clamping member; and

Fig. 5 is a face view of the bottom clamping member.

In the embodiment illustrated, the handle comprises a pair of complementary members, each of which is of the same construction, preferably being formed of hollow tubular metal stock and formed with a straight portion 1 which, at its lower end, is curved outwardly at the point 2 and then bowed downwardly at the point 3, terminating in a flattened end 4. The top end of each member is outwardly flared, as at 5. The two complementary members are assembled side by side to provide a bottom bow or arch adapted to receive between them the lawn mower, with the flattened portions receiving, in the openings 6 thereof, the axle of the lawn mower. These two members are secured in their assembled position by an intermediate clamp comprising the two halves 7 which have formed, on their meeting faces, a pair of diverging grooves 8 which receive the tubular members of the handle. A clamping bolt or rivet 9 secures the two clamping members 7 together in a clamping position and it will be noted that the opening for this bolt passes through the clamping members between the diverging grooves.

The top ends of the members 1 are also connected together by a pair of clamps 10 which not only connect the top ends together but also connect the cross bar 11 to the top ends. The clamps 10 have formed, in the meeting faces thereof, a pair of diverging grooves 12 which receive the diverging ends 5 of the members 1, and the meeting faces of these clamps also have transversely extending grooves 13 which receive the cross bar 11. The two halves 10 are likewise bolted, face to face, by means of the bolt or rivet 14 which passes through an opening 15 disposed between the diverging grooves 12.

The channel 13 in each of the sections 10 is also provided with a teat 16 adapted to enter openings 17 in the cross bar 11 to prevent the cross bar from turning.

I claim as my invention:

1. A lawn mower handle comprising a pair of complementary members arranged side by side, each having a straight portion and an outwardly bowed portion, the straight portions of the two members, when assembled, lying parallel and the bowed portions forming a yoke, a pair of clamps embracing the parallel members, each clamp having a pair of grooves in its meeting face diverging toward its bottom to receive a part of the straight portion and a part of the bowed portion, a cross member at the top of the straight portion, and clamping means for connecting the cross member to the straight portion.

2. A lawn mower handle comprising a pair of complementary members, each having a straight portion and an outwardly bowed portion, the straight portions of the two members, when assembled side by side, lying parallel, and the bowed portions forming a yoke, a pair of clamps embracing the neck of the yoke, each having a pair of grooves therein diverging toward their lower ends to embrace both the straight and bowed portions, the straight portions, at their upper ends diverging, a cross bar arranged at the top of the straight portions, and a pair of clamps, each having, on its meeting face, a pair of converging recesses to receive the ends of the straight portion, and a transversely extending recess to receive a portion of the handle bars.

3. A lawn mower handle comprising a pair of complementary members arranged side by side, each having a straight portion and an outwardly bowed portion, the straight portions lying parallel and forming a stem and the bowed portions diverging and forming a yoke, means connecting the members together at the beginning of the yoke and preventing separation of the members, the top of the stem being enlarged, a cross handle bar mounted at the top of the stem, a pair of clamps embracing the top of the stem and the handle bar, the walls of the meeting faces of the clamps having recesses which diverge and transverse recesses, the diverging recesses receiving the enlarged portion of the stem and the transverse recesses receiving the handle bar, and means for securing the clamping members together.

4. A lawn mower handle comprising a pair of complementary members arranged side by side, each having a straight portion provided at its top with a diverging end at its opposite end with a bowed portion, the straight portion lying parallel and forming a stem, and the bowed portions diverging and forming a yoke, means connecting the members together at the beginning of the yoke and preventing separation thereof, a cross handle mounted at the top of the stem, a pair of clamps embracing the top of the stem and the cross handle, each having a pair of converging recesses in the meeting faces thereof and receiving the diverging ends of the straight members, and a transverse recess receiving the cross bar, and means for securing the clamping members together.

ROBERT S. KERSEY.